No. 755,382. PATENTED MAR. 22, 1904.
C. OLIVER.
DEVICE FOR TESTING ELECTRIC CURRENTS.
APPLICATION FILED NOV. 29, 1902.
NO MODEL.
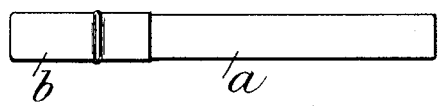
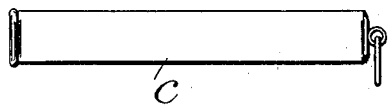
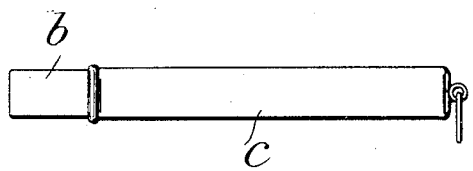
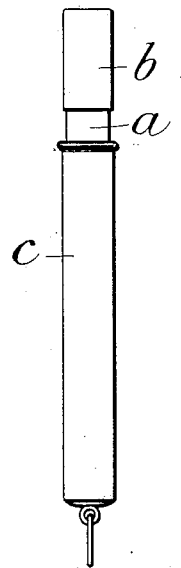
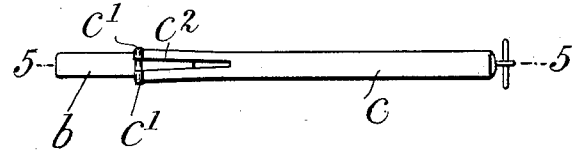
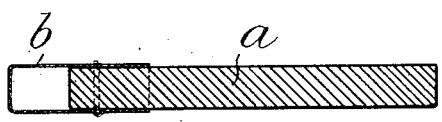
WITNESSES:
Henry J. Schreiber
Karl Kaeble
INVENTOR
Charles Oliver
by Goemer Niles
ATTORNEYS.

No. 755,382. Patented March 22, 1904.

UNITED STATES PATENT OFFICE.

CHARLES OLIVER, OF WOOLWICH, ENGLAND.

DEVICE FOR TESTING ELECTRIC CURRENTS.

SPECIFICATION forming part of Letters Patent No. 755,382, dated March 22, 1904.

Application filed November 29, 1902. Serial No. 133,200. (No model.)

*To all whom it may concern:*

Be it known that I, CHARLES OLIVER, electrical engineer, a subject of the King of Great Britain, residing at Woolwich, in the county of Kent, England, have invented a Device for Testing Electric Currents, of which the following is a specification.

This invention relates to a new or improved "detector" or appliance for use in testing for electric currents.

Heretofore in order to ascertain if an electric wire or electric circuit (or any part of any machine or metal-work) is "alive" sometimes a galvanometer (or other means, such as incandescent electric lamp) has been employed, while in many cases the operative or person desiring to make such test simply momentarily touches the wire or part in question, so as to receive a shock or indication to thereby ascertain in this crude way whether the wire or circuit or part is alive or not. Such methods of testing as heretofore employed have various drawbacks, and, moreover, the last-named crude method is usually exceedingly disagreeable or dangerous to the operator and for high voltages impossible owing to the danger involved.

Now my present invention is designed to overcome the aforesaid drawbacks and comprises a detector or appliance for the above-named purpose which is very simple and inexpensive to produce, is very compact, and portable, (same being adapted to be carried in the pocket of the user,) and whereby the person using same can without danger or discomfort readily ascertain if any wire or circuit or part to be tested is alive or not, even at dangerous voltages.

According to my invention I take any suitable insulating or non-conducting material (advantageously of a non-breakable or not easily breakable character) and I so treat such material as to make same of or produce in or on same a suitable low electrical conductivity, and this material of low electrical conductivity or having low electrical conductivity I arrange and mount in any suitable cap, case, or covering or other means for holding or applying or holding and applying same in use, as hereinafter described.

My invention may be carried into practice as follows: I take an insulating material, such as cedar-wood or other suitable wood or other suitable material through which little or no shock can be felt when put in circuit, and I dip or otherwise coat or apply to same a solution of shellac and black-lead in spirit, and when the coating is dry I polish or rub the surface, and thereby produce a low electrical conductivity in or upon said material; but I do not confine myself to shellac and black-lead, as aforesaid, as it will be obvious that other materials of suitable conductivity might be employed to produce the desired low electrical conductivity for my purpose. For instance, another method of carrying out my present invention would be to mix black-lead with porcelain and form same into sticks or pencils or other-shaped devices of any suitable form and then bake or fire same.

In carrying my present invention into practice I take a piece of any suitable size and shape of the aforesaid material of low electrical conductivity, (which for the sake of brevity I shall hereinafter refer to as the "resisting material,") say, for instance, a piece of about the size of an ordinary pocket-pencil, (say a strip of such material about two inches long and of flattened form,) as illustrated by way of example in the accompanying drawings, in which—

Figure 1 is a view of the flat side of said resisting material, showing same with a metal cap fitted thereto, as and for the purposes hereinafter explained. Fig. 2 is a side view of a sheet-metal case of flattened form adapted to receive and inclose therein said strip of resisting material. Fig. 3 shows the sheet-metal case inclosing the resisting material. Fig. 4 is an edge view of Fig. 3, showing the spring-mouth to said sheet-metal case. Fig. 5 is a longitudinal sectional view on line 5 5, Fig. 4. Fig. 6 shows a modification, as hereinafter explained.

The strip or rod of resisting material $a$ has one end or part provided with a metal cap $b$, or instead of employing such metal cap $b$ such end or part of said resisting material may be treated in any suitable manner so as to render such end or part more highly conductive than the other part, and such end or part, as well as such metal cap $b$, I shall for the sake of brevity hereinafter refer to as the "metal cap."

*c* is sheet-metal case of flattened form, adapted to receive therein said strip of resisting material *a*, and also, if desired, the metal cap *b* or part thereof may be adapted to slide into or onto said cover *c*, or in order to prevent the possibility of the appliance being wrongly used (*i. e.*, while the metal cap *b* is in contact with the cover *c*) and the current passing direct from the metal cap *b* to the metal case *c* I may make the resisting material *a* longer than the case *c*, as shown in Fig. 6, or of such length or shape as to render it impossible for the metal cap *b* to touch the metal cover *c* when the latter is slid over the resisting material *a*.

In order to clip or hold the resisting material *a* in any desired position, (*i. e.*, when drawn out of or inserted in the cover *c* to a greater or less extent,) the end *c'* may be formed spring-mouthed, for instance, by forming said cover *c* with longitudinal slits $c^2$, as shown in Fig. 4, whereby the spring ends *c' c'* will tend to grip and hold firmly between same the cap *b* or the resisting material in whatever position same may be placed therein between, while at same time making or maintaining electric contact therewith.

The operation is as follows: By drawing out the resisting material *a* to a greater or less extent from the aforesaid case *c* and then holding the case or cover *c* of the detector or appliance in one hand and touching one wire or terminal or part in question with the cap *b* on said appliance and touching with the other hand (or otherwise making connection through the body to) the other pole of the circuit thereby a gentle shock or indication will be received if the wire or part be alive and the current be at sufficient voltage, and by sliding the resisting material *a* in or out of the case *c*, and so varying the length of resistance between the metal cap *b* and the case *c*, thereby the strength of shock or indication will be diminished or increased. Or the instrument may be used as follows: The resisting material *a*, with the metal cap *b* thereon, may be completely withdrawn from the case *c* and grasped between the fingers at any desired point along the length of said resisting material *a*, and then by touching one wire or terminal or part with the metal cap *b* and making connection with the other pole, as before, a gentle shock or indication will be obtained as before. Or the instrument may be used as follows: The material *a*, with cap *b* thereon, may be completely withdrawn from the case *c* and reversed and the outer end of the cap *b* inserted in the spring-mouth of the case *c*, and then the material *a* is grasped between the fingers, as last described, and the wire or terminal or part to be tested is touched with the case *c*.

In Fig. 6 I have illustrated an arrangement in which the resisting material *a* is rather longer than the case *c*, so as to thereby render it impossible for the cap *b* to touch the case *c* under any circumstances when the latter is in position on the resisting material.

It will be obvious that I do not confine myself to the form illustrated or to any particular form of case or holder or means for carrying this detector or appliance for use as aforesaid, nor do I restrict myself to the employment of any such case or holder at all should it be desired to dispense therewith.

If desired, my invention may be carried out in the form of a lead-pencil—that is to say, the resisting material of low electrical conductivity may be provided with a lead core, as in an ordinary lead-pencil, and same may be used either with or without a case. Also, if desired, my invention may be carried out vice versa—that is, I may employ the insulating or non-conducting material on the exterior or to form the exterior surface, the conducting material being located inside such non-conducting material.

Having now described my invention, what I claim as new, and desire to secure by Letters Patent of the United States, is—

1. A detector or appliance for use in testing for electric currents, comprising a rod of insulatory material provided with a coating of a substance of low electrical conductivity, and means at one end of said rod rendering the end more highly conductive than the remainder of the rod, substantially as set forth.

2. A detector or appliance for use in testing for electric currents, comprising a rod of resisting material of low electrical conductivity, means at one end of said rod rendering the end more highly conductive than the rod itself, and a case or cover for said rod, substantially as set forth.

3. A detector or appliance for use in testing for electric currents, comprising a rod of insulatory material provided with a coating of a substance of low electrical conductivity, and a metal cap at one end of said rod, substantially as set forth.

4. A detector or appliance for use in testing for electric currents, comprising a rod of resisting material of low electrical conductivity, a metal cap at one end of said rod, and a case or cover for said rod, substantially as set forth.

5. A detector or appliance for use in testing for electric currents, comprising a strip or rod of wood provided with a coating of a substance of low electrical conductivity, substantially as set forth.

6. A detector or appliance for use in testing for electric currents, comprising a strip or rod of wood provided with a substance of low electrical conductivity, and a metal cap at one end of said strip or rod, substantially as set forth.

7. A detector or appliance for use in testing for electric currents, comprising a strip or rod of wood provided with a coating of a substance of low electrical conductivity, a metal cap at one end of said strip or rod, and a case or cover for said strip or rod, substantially as set forth.

8. A detector or appliance, for use in testing for electric currents, comprising a strip or rod of wood, a coating of black-lead and shellac thereon, and a metal cap at one end thereof, substantially as and for the purposes hereinbefore set forth.

9. A detector or appliance, for use in testing for electric currents, comprising a strip or rod of wood, a coating of black-lead and shellac thereon, a metal cap at one end thereof and a case or cover to receive therein said resisting material, substantially as and for the purposes hereinbefore set forth.

In witness whereof I have hereunto set my hand in presence of two witnesses.

CHARLES OLIVER.

Witnesses:
H. D. JAMESON,
A. NUTTING.